United States Patent [19]

Lamb

[11] Patent Number: 4,569,200
[45] Date of Patent: Feb. 11, 1986

[54] CONTROL APPARATUS FOR TIDAL TURBINE

[76] Inventor: Carl W. Lamb, 4516 Nicholas Dr., Knoxville, Tenn. 37912

[21] Appl. No.: 609,974

[22] Filed: May 14, 1984

[51] Int. Cl.$^4$ .............................................. F16D 31/02
[52] U.S. Cl. ....................................... 60/398; 405/76; 405/78
[58] Field of Search ................... 60/398, 696; 405/75, 405/76, 78, 77; 290/42, 43, 54

[56] References Cited

U.S. PATENT DOCUMENTS

| | | | |
|---|---|---|---|
| 785,879 | 3/1905 | Helvie | 405/76 X |
| 2,577,325 | 12/1951 | Haskell | 405/76 |
| 2,820,148 | 1/1958 | Southwick | 407/76 X |

Primary Examiner—Edward K. Look
Attorney, Agent, or Firm—Harvey B. Jacobson

[57] ABSTRACT

A tide-operated turbine is located in a holding tank having communication with a tide-fed reservoir so as to supply the turbine with operating water. To provide continuous, around-the-clock operation of the turbine by insuring a positive operating head throughout tidal cycles, a control system causes the turbine to discharge into the ocean through a turbine discharge port in an ocean-fronting wall of the holding tank at times during each tide cycle when the tidal level is below the discharge port, but closes the discharge port and causes the turbine to discharge into the holding tank at times when the tidal level is above the discharge port. The control system also provides drainage of the holding tank during each tide cycle.

17 Claims, 5 Drawing Figures

CONTROL APPARATUS FOR TIDAL TURBINE

BACKGROUND OF THE INVENTION

This invention relates to water turbines operated by tidal flow, for example for electricity generation and the like.

Turbines of the type with which the present invention is concerned depend on a positive water head differential as between the turbine inlet and the turbine outlet, in order to obtain water flow through the turbine to operate same. If such a turbine is to be operated by tidal power on a continuous, around-the-clock basis, provision must be made for insuring that there is a continuous source of high level water at the turbine inlet and a continuous capacity for the turbine to discharge to a lower level throughout a tidal cycle, despite the ever-changing water level of the tide as it rises and recedes. The invention provides a system for achieving such operation.

STATEMENT OF PRIOR ART

The following U.S. patents pertain to water turbines operated by tidal flow and the like. However, none of these disclose the features of the present invention.

| | | |
|---|---|---|
| 647,944 | M. D. Compton | Apr. 24, 1900 |
| 757,909 | T. F. Gilliland | Apr. 19, 1904 |
| 785,879 | G. M. Helvie | Mar. 28, 1905 |
| 959,214 | S. B. Goff | May 24, 1910 |
| 1,055,033 | P. Hale | Mar. 4, 1913 |
| 1,868,087 | R. S. Blair | July 19, 1032 |
| 2,566,447 | J. H. Griswold | Sept. 4, 1951 |
| 4,039,847 | R. E. Diggs | Aug. 2, 1977 |

SUMMARY OF THE INVENTION

The invention provides control apparatus for a water turbine mounted between a tide-filled reservoir separated from the ocean by a seawall or the like, and a holding tank which also has an ocean-fronting wall, the turbine being mounted at a level between the high and low tide levels, and the reservoir having a capacity, when filled by tide water flowing over the seawall at high tide, to operate the turbine until the reservoir is again replenished at the next high tide.

The control apparatus in accordance with the invention includes a turbine discharge port in the ocean-fronting wall of the holding tank substantially at the level of the tubine outlet, and means whereby whenever the tidal level is suitably below the discharge port, the turbine is caused to discharge directly into the ocean through the port, but whenever the tidal level rises above the discharge port, the port is automatically shut and the required head differential between the turbine inlet and outlet is maintained by allowing the turbine to discharge into the holding tank. A further drainage port is provided at the bottom of the ocean-fronting wall of the holding tank (above low tide level) for draining water accumulated in the holding tank each time there is a low tide. The capacity of the holding tank is such that accumulated water does not reach the level of the turbine before it is discharged through the drainage port.

In a preferred form of the invention, the respective ports in the ocean-fronting wall of the holding tank are each opened and closed by a plug carried on a float box pivotally mounted on the outside of the wall, for raising and lowering movement by the incoming and outgoing tide. Turbine sluice water may be directed through the discharge port by a drawbridge arrangement also controlled, through a cable and pulley system, by one of the floats.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a front elevational view of the apparatus shown in FIG. 3.

FIG. 5 is an elevational view of an adjustable stop which may be used in conjunction with the apparatus.

DESCRIPTION OF THE PREFERRED EMBODIMENT

Figure 1:
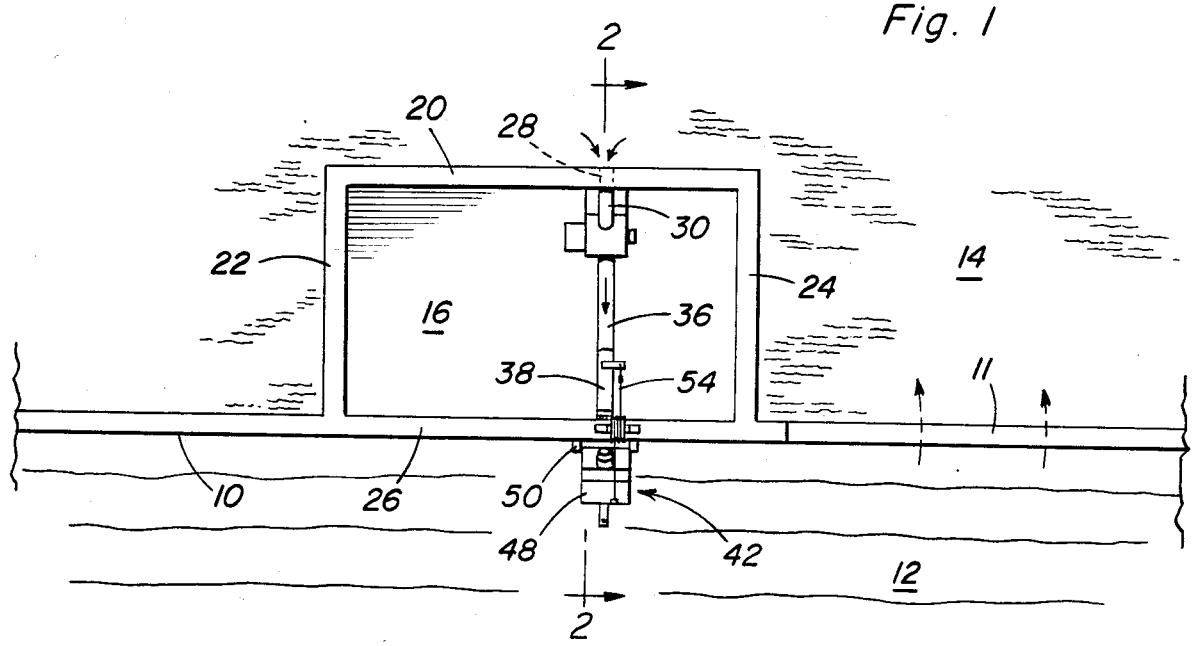
FIG. 1 is a semi-diagrammatic plan view of a tide-operated turbine installation equipped with control apparatus in accordance with the invention.

The drawings illustrate a tide-operated turbine installation situated at a suitable beach or like location, the installation having a seawall 10 separating the open ocean 12 from an enclosed reservoir 14 for tide water. Seawall 10 may, for example, be built across an inlet having natural sidewalls to form the reservoir, or the entire reservoir may be man made.

A holding tank 16 is formed by a rear wall 20 within the reservoir, sidewalls 22, 24, and a ocean-fronting front wall 26 which is part of the main seawall 10. In the illustrated embodiment, the holding tank is shown as being situated within the reservoir 14 but this is not essential so long as there is communication through one wall (as will be described) between the reservoir and the holding tank, and another wall of the holding tank directly fronts the ocean.

Figure 2:
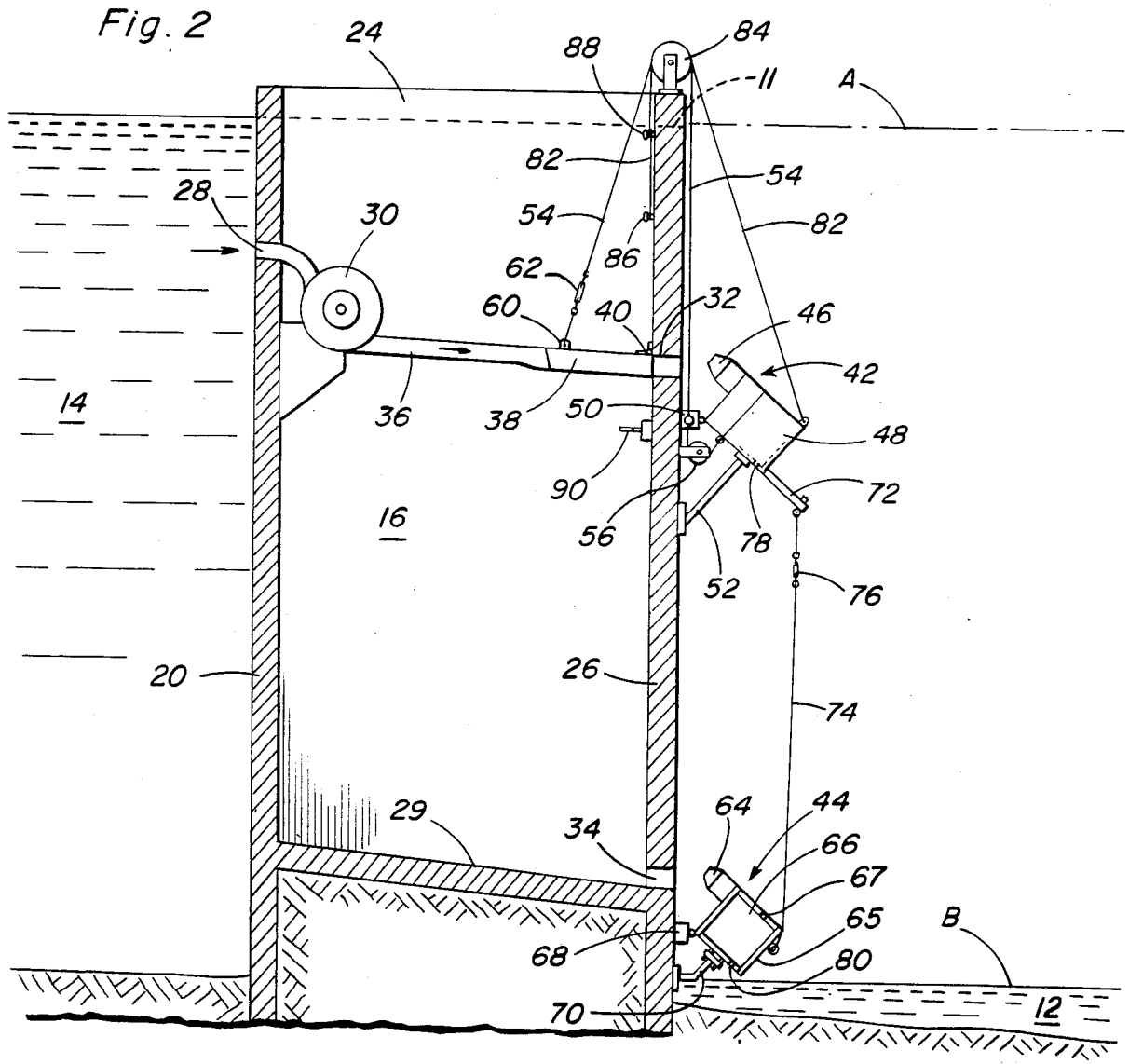
FIG. 2 is a sectional view on line 2—2 of FIG. 1 showing the installation in a low tide condition.

The high tide level is indicated at A, and the low tide level at B, (FIG. 2). Between these levels, an inlet port 28 is formed in the rear wall 20 of the holding tank, forming an inlet for water from the reservoir to flow into a water turbine 30 suitably mounted in the holding tank. The ocean-fronting wall 26 of the holding tank is provided with an upper turbine discharge port 32 suitably located below the level of port 28, and a drain port 34 adjacent the base 29 of the tank above level B. The turbine may discharge either directly into the holding tank through a turbine outlet tube 36, or into the sea through port 32, when a pivotal tube extension or "drawbridge" 38 connects tube 36 with port 32 as will be described. Tube extension 38 is pivotally connected to the interior of wall 26 above port 32 by a suitable hinge assembly 40, and is raised and lowered by control means to be described below.

It will be noted that the walls of holding tank 16 are all higher than the high tide level A so that seawater cannot flow directly into the holding tank over any of these walls. However, at least a portion of seawall 10 outside of the holding tank has its upper edge 11 at a level below the high tide level, so that the reservoir 12 can be replenished with water at high tide. The size of the reservoir should be sufficient to provide enough water above the level of turbine inlet port 28 to run the turbine for a complete tidal cycle, and edge 11 of the seawall should be of sufficient length to allow the reservoir to be suitably replenished at high tide. Edge 11 may be of the order of one foot below high tide level.

On the outside of front wall 26 of the holding tank are mounted a pair of flow control assemblies 42, 44 for the respective ports 32, 34. Assembly 42 comprises a port-obturating plug 46, for example, of frusto-conical shape, carried on a float box 48 pivotally secured to the outside of wall 26 below port 32 by a pillow-block assembly 50. The balance of the float box is such that when unsupported, it will tilt down against a stop bracket 52 secured to the wall (FIG. 2). To the underneath of float box 48 is secured a cable 54 with a weight 55, the cable extending around a sheave 56 on the outside of wall 26 up to a main pulley 58 on top of wall 26 and down to a connection eye 60 on tube extension 36, with an interposed turnbuckle 62 in the cable to adust the cable length if required. The pulley and cable arrangement is such that when assembly 42 is in its downwardly tilted position, opening port 32 (FIG. 2), tube extension 38 is also lowered to connect up with the turbine discharge tube, so as to expel turbine sluice water into the open sea through port 32. When, however, assembly 42 is raised by the rising tide, plug 46 is caused to close port 32, and the pulley and cable system raises tube extension 38 out of the flow of turbine sluice water (FIG. 3) so that the turbine discharges into the holding tank.

Figure 3:
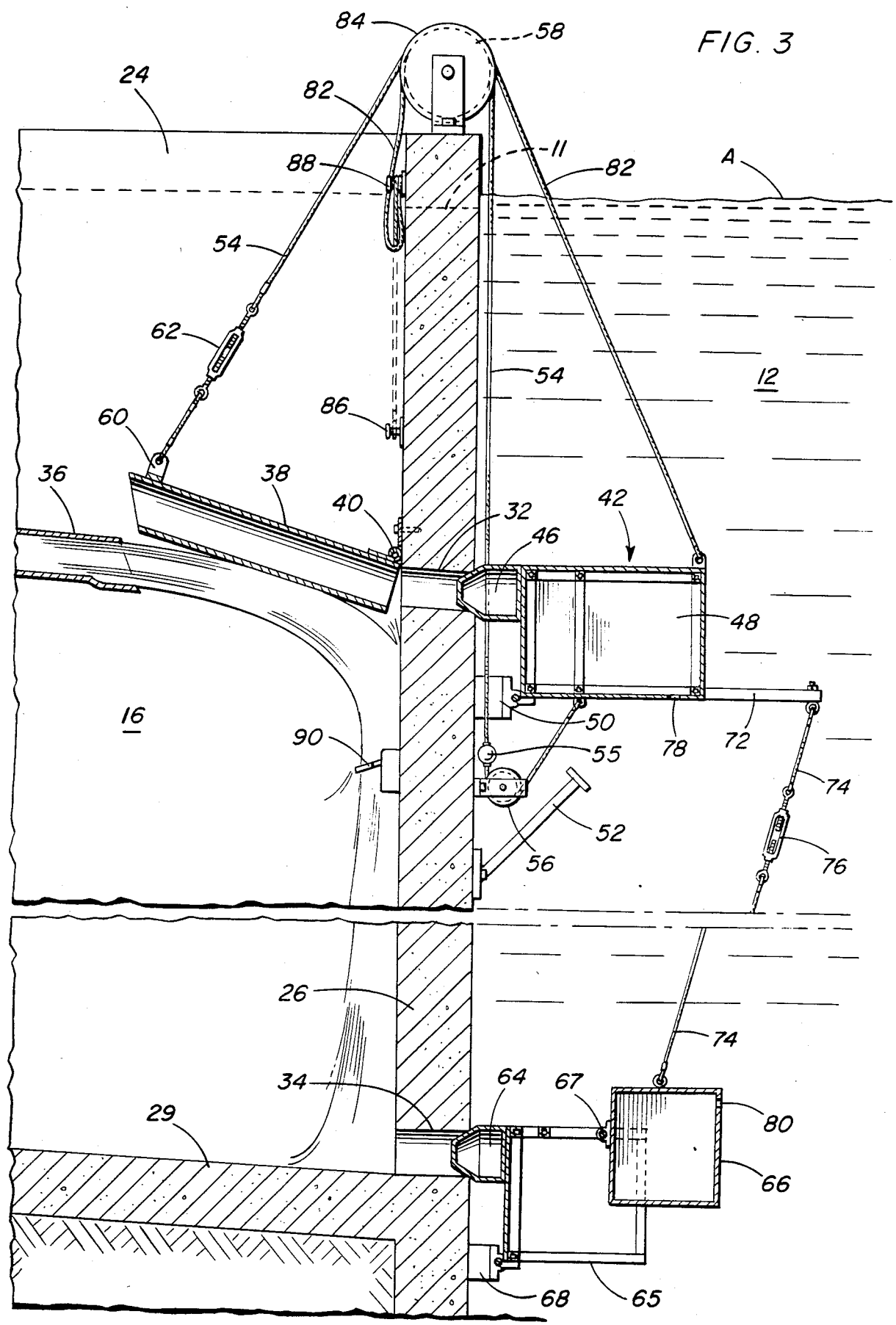
FIG. 3 is a view similar to FIG. 2 on an enlarged scale and showing the installation in a high tide condition.
Figures 4, 5:
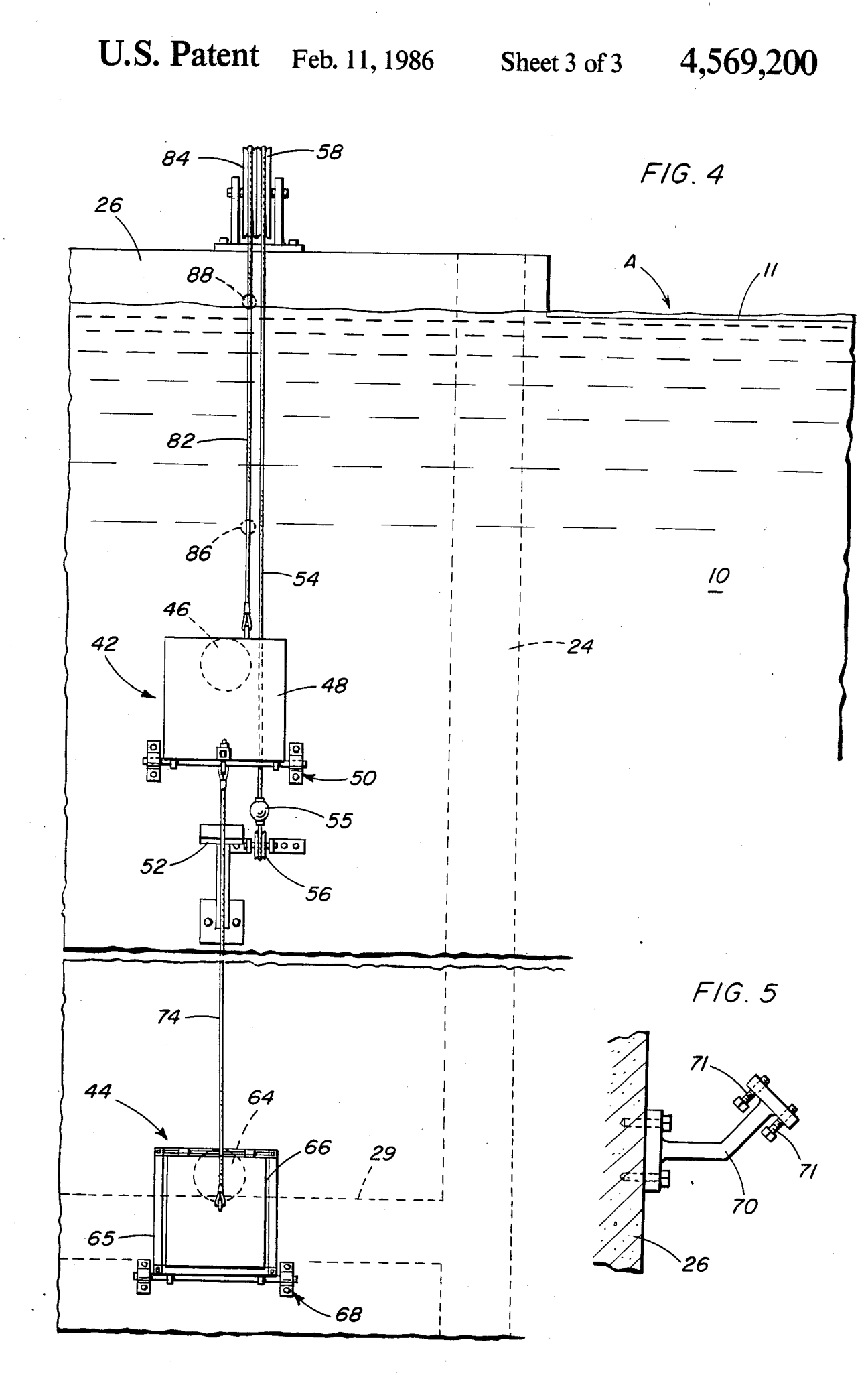

Assembly 44 is of similar construction to assembly 42, comprising an obturating plug 64 carried by a frame 65 having a float box 66 pivotally secured to frame 65 by suitable pivot means 67 the frame itself being pivotally secured on the outside of wall 26 by a pillow block assembly 68, so as to normally tilt down to a port opening position against an adjustable stop 70, (not shown in FIG. 3) when the tide is out. When the tide comes in, it raises frame 65 and float box 66 so that plug 64 closes port 34 (FIG. 3). Stop 70 may have adjusting screws 71, as shown in FIG. 5.

The upper float box 48 includes an extension arm 72 connected by a cable 74 and turnbuckle 76 to the lower float box 66, and the float boxes have respective air expulsion ports 78, 80 in the lower outside corners. Operation of the apparatus thus far described is as follows:

With the tide just starting to come in from level B (FIG. 2) both ports 32 and 34 are open, the tube extension 38 is lowered so that the turbine discharges into the sea through port 32, and the holding tank has been emptied through port 34 in a previous tide cycle. When the tide level reaches air port 80 in float box 66, air is sealed inside the box. The rising tide then raises box 66 causing plug 64 to close port 34 and preventing the rising tide form entering the holding tank through port 34. When the tide reaches air port 78 in upper float box 48, air is sealed in this box and the box also starts to lift with the rising tide. This action, through the pulley and cable system, also starts raising tube extension 38 lifting it out of the flow of turbine sluice water. Continued rising of the tide causes plug 46 to close port 32 before seawater can enter the holding tank through port 32, and to lift tube extension 38 fully clear of the turbine outlet tube, so that the turbine starts filling the holding tank (FIG. 3). Also, the length of cable 74 is such that when assembly 42 rises to close port 32, float box 66 is pivoted in frame 65 by the cable (FIG. 2) thereby expelling air through port 80 and making the whole of assembly 44 dead weight. This condition continues until the tide again falls to start uncovering assembly 42.

At high tide, the water in reservoir 12 is replenished by flow of water over upper edge 11 of the seawall, and the tide then starts to recede. When float box 48 is sufficiently uncovered, after the tide level is below port 32, the float box starts pivoting down toward stop bracket 52, thereby also lowering tube extension 38 into the flow of the turbine sluice water. When the float box is seated against stop 52, the sluice extension is fully lowered, thereby again directing the turbine discharge into the open sea through port 32. As the tide continues to go out, cable 74 becomes slack allowing float box 66 to pivot back into frame 65, and further slack will allow the whole of assembly 44 (being dead weight) to pivot back down against stop 70, thereby opening port 34. This may be timed to occur when the water level in the holding tank is just above the receding tide level to obtain maximum drainage time for the holding tank. When the tide recedes to level B, the holding tank is fully drained. A tidal cycle has now been completed and the apparatus is in the condition described originally with respect to FIG. 2 with the turbine discharging directly into the sea, and awaiting the next incoming tide to repeat the cycle.

It will be appreciated that the installation operates fully automatically and provides continuous round-the-clock operation of a turbine under tidal power alone. Various parameters are of significance however for effective operation. For example, the lower down in the holding tank the turbine can be positioned, the greater is the available operating head and power output from the turbine. This also, however, affects the required capacity of the holding tank, for the lower down the turbine and port 32, the longer will port 32 be closed by plug 46 in a tidal cycle with the turbine discharging into the holding tank. Accordingly, the lower down the turbine, the larger the quantity of water which will be accumulated in the holding tank with each cycle and therefore the larger the area required for the holding tank. This consideration is also connected with the size of port 34, since the holding tank should have adequate drainage capacity at low tide.

As noted above, the system operates automatically to provide continuous turbine operation. In case, however, it is necessary to shut down the system, an operating cable 82 may be provided connected to float box 48 and extending over an auxiliary pulley 84 at the top of wall 26. When it is required to shut down the system, this cable can be tightened with the floats raised to close ports 32 and 34 and wound around a lower securement pin 86, or the like, on the inside of wall 26, cable 74 serving to lift float box 66. When the system is operating automatically, cable 82 may be slackened and/or wound around an upper pin 88 on the inside of wall 26.

The interior of the holding tank may also be provided with a safety switch 90 for terminating operation of the turbine, should the water level in the holding tank rise to a dangerous level. When the turbine is shut down, both of the ports 32 and 34 should be closed as previously described.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A turbine installation operable continuously on a round-the-clock basis by tidal power comprising a reservoir having a seawall over which tide water is adapted to flow at high tide to fill the reservoir, a holding tank communicating with the reservoir through a turbine inlet located at a level between the high and low tide levels, the holding tank also having an ocean-fronting wall, a water turbine positioned to receive water from the reservoir through the inlet, the turbine having an outlet in the holding tank, a turbine discharge port in the ocean-fronting wall of the holding tank below the level of the turbine inlet and above low tide level, a drainage port in the holding tank below the discharge port, obturating means for the discharge and drainage ports, turbine sluice water diverter means for selectively connecting the turbine outlet to the turbine discharge port, and control means for the obturating means and diverter responsive to tidal level means for causing the turbine to discharge through the diverter means and discharge port into the ocean at times when the tidal level is below the discharge port, to deactivate the diverter means and close the discharge port at times when the tidal level is above the discharge port, whereby the turbine discharges into the holding tank at such times, to close the drainage port during each incoming tide and open the drainage port during each outgoing tide so as to drain the holding tank prior to the next incoming tide, the reservoir having a capacity when filled by tide water flowing over the seawall at high tide to operate the turbine until the reservoir is replenished at the next high tide, and the holding tank having a capacity such that turbine sluice water accumulated therein during a tidal cycle when the turbine discharges into the holding tank does not reach the level of the turbine prior to opening of the drainage port.

2. The invention of claim 1 wherein the obturating means comprises a closure plug for each of said ports and the control means includes a float for each plug securement means operably securing the respective float on the outside of said ocean-fronting wall of the holding tank for upward movement of the float on each incoming tide causing the respective plug to close the respective port as the tidal level approaches the level of the respective port.

3. The invention of claim 2 wherein each plug has a frusto-conical port-obturating portion.

4. The invention of claim 2 wherein each float comprises a frame and a float box carried by the frame, the securement means comprising pivot means connecting the frame to said ocean-fronting wall.

5. The invention of claim 4 including stop means secured on the ocean-fronting wall below the respective frames for arresting downward movement of the respective frames.

6. The invention of claim 4 wherein the float box for the drainage port is pivotally mounted in its respective frame and the installation includes cable means or the like connecting the float box for the drainage port to the frame of the other float, for pivoting the float box for the drainage port upwardly when the other float is moved upwardly by the rising tide so as to expel air from the float box for the drainage port making the float for the drainage port dead weight so that it may drop to open the drainage port during a receding tide before the float is uncovered by the receding tide.

7. The invention of claim 2 wherein the control means includes linkage means between the diverter means and the float associated with the turbine discharge port for activating the diverter means so as to connect the turbine outlet with the discharge port responsive to dropping of the float on a receding tide, and for deactivating the diverting means causing the turbine to discharge into the holding tank responsive to raising of the float on an incoming tide.

8. The invention of claim 7 wherein the diverter means comprises an elongate drawbridge device and the linkage means comprises a cable means connecting the float with the drawbridge over a pulley on top of the ocean-fronting wall of the holding tank.

9. The invention of claim 8 wherein the drawbridge has means pivotally connecting same to the inside of the ocean-fronting wall of the holding tank above the discharge port and the cable is connected between the float and drawbridge for raising the drawbridge to an inoperative position responsive to raising movements of the float for closing the discharge port, and for lowering the drawbridge into operative position connecting the turbine outlet with the discharge port responsive to lowering movements of the float opening the discharge port.

10. The invention of claim 9 including manually operable means for retaining the obturating means in positions closing the respective ports and rendering the respective floats inoperable by tidal fluctuations, the manually operable means comprising a first cable interconnecting the floats and a second cable leading from one of the floats to the top of said ocean-fronting wall.

11. Control apparatus for a tide-operated turbine located in a holding tank having an ocean-fronting wall, the turbine receiving tide water from a tidal-filled reservoir, the holding tank having a turbine discharge port in the ocean-fronting wall between low and high tide levels, the control apparatus causing the turbine to discharge into the ocean through said discharge opening at times during each tide cycle that the tide level is below the discharge port, and to discharge into the holding tank at times during each tide cycle that the tide level is above the discharge port, the control apparatus comprising a float controlled plug on the outside of the ocean-fronting wall for closing the port responsive to raising of the float by rising tide water as the tide approaches the level of the discharge port, and for opening the port responsive to falling of the float on a receding tide, the control apparatus further comprising turbine sluice water diverter means operatively connected with the float for movement responsive to float movements between an operative position diverting turbine sluice water from a turbine outlet into the ocean through the discharge port, and an inoperative position allowing the turbine outlet to discharge into the holding tank, the holding tank further including drainage means responsive to tide level for emptying the tank of sluice water during each tide cycle.

12. The invention of claim 11 wherein the drainage means, comprises a drain opening in the ocean-fronting wall at the base of the holding tank above low tide level, and a further float controlled plug on the outside of the ocean-fronting wall for closing the drain opening responsive to raising of the float by each rising tide, and for opening of the drain opening by falling of the float during each receding tide.

13. The invention of claim 11 wherein the diverter means is operably connected to the float by means of a cable connected between the diverter means and the float around pulley means on the ocean-fronting wall of the holding tank.

14. The invention of claim 13 wherein the diverter means comprises a drawbridge pivotally attached to the inside of the ocean-fronting wall above the discharge port, and the cable is connected between the float and the drawbridge for raising the drawbridge to inoperative position responsive to rising movements of the float, and for lowering the drawbridge to operative position responsive to lowering movements of the float.

15. The invention of claim 12 including cable means extending to the top of the ocean-fronting wall for tying up the floats in positions wherein the associated plugs close the respective ports so as to render the floats non-responsive to tidal fluctuations.

16. The invention of claim 11 including safety means for terminating operation of the turbine responsive to turbine sluice water attaining a predetermined level in the holding tank.

17. The invention of claim 12 wherein the further float controlled plug includes a movable float box connected by cable means to the float controlled plug of the discharge opening, the cable being of a length to move the movable float box upwardly when the float of the discharge opening is floated upwardly on a rising tide in order to discharge air from the movable float box through an air discharge opening therein, making the further float dead weight until it is uncovered by a receding tide.

* * * * *